(12) United States Patent
Maqbool

(10) Patent No.: US 11,578,681 B2
(45) Date of Patent: Feb. 14, 2023

(54) SYSTEMS AND METHODS FOR ANTI-PHASE OPERATION OF PULSE COMBUSTORS

(71) Applicant: University of Maryland, College Park, College Park, MD (US)

(72) Inventor: Daanish Maqbool, Hyattsville, MD (US)

(73) Assignee: UNIVERSITY OF MARYLAND, College Park, MD (US)

( * ) Notice: Subject to any disclaimer, the term of this patent is extended or adjusted under 35 U.S.C. 154(b) by 0 days.

(21) Appl. No.: 15/558,022

(22) PCT Filed: Mar. 18, 2016

(86) PCT No.: PCT/US2016/023241
§ 371 (c)(1),
(2) Date: Sep. 13, 2017

(87) PCT Pub. No.: WO2016/200460
PCT Pub. Date: Dec. 15, 2016

(65) Prior Publication Data
US 2018/0058319 A1   Mar. 1, 2018

Related U.S. Application Data

(60) Provisional application No. 62/135,310, filed on Mar. 19, 2015.

(51) Int. Cl.
*F02K 7/075* (2006.01)
*F02C 5/10* (2006.01)

(52) U.S. Cl.
CPC ............... *F02K 7/075* (2013.01); *F02C 5/10* (2013.01); *F05D 2240/35* (2013.01)

(58) Field of Classification Search
CPC ............... F02C 5/11; F02C 5/10; F02K 7/075
See application file for complete search history.

(56) References Cited

U.S. PATENT DOCUMENTS 2,480,540 A   8/1949   Bodine, Jr.
2,480,626 A   8/1949   Bodine
(Continued)

FOREIGN PATENT DOCUMENTS

CN   85101521 A   1/1987
CN   87105408 A   3/1988
(Continued)

OTHER PUBLICATIONS

Giammar et al "Noise Reduction Using Paired Pulse Combustors", American Institute of Aeronautics and Astronautics, J. Energy, vol. 2, No. 5 pp. 319-320 (Year: 1978).*
(Continued)

*Primary Examiner* — Ted Kim
(74) *Attorney, Agent, or Firm* — Wilmer Cutler Pickering Hale and Dorr LLP

(57) ABSTRACT

A pulse combustor system for operating pulse combustors in anti-phase. The pulse combustor system includes two pulse combustors connected at their combustion chambers by a connecting tube. Each of the pulse combustors has a fundamental oscillation mode and one or more additional oscillation modes when operated in isolation. The connecting tube has a length corresponding to ¼ of the fundamental oscillation mode wavelength.

10 Claims, 9 Drawing Sheets

(56) References Cited

U.S. PATENT DOCUMENTS

| | | | |
|---|---|---|---|
| 2,496,351 A | 2/1950 | Mazzoni | |
| 2,523,308 A * | 9/1950 | Paulh | F02K 7/06 60/225 |
| 2,543,758 A | 3/1951 | Bodine | |
| 2,557,128 A | 6/1951 | Magill | |
| 2,628,471 A * | 2/1953 | Dunbar | F02K 7/06 60/225 |
| 2,632,294 A | 3/1953 | Wall | |
| 2,639,580 A | 5/1953 | Stuart | |
| 2,698,510 A | 1/1955 | Britton | |
| 2,731,795 A | 1/1956 | Bodine | |
| 2,745,861 A | 5/1956 | Bodine | |
| 2,750,733 A | 6/1956 | Paris | |
| 2,796,734 A | 6/1957 | Bodine | |
| 2,812,635 A | 11/1957 | Foll et al. | |
| 2,834,181 A | 5/1958 | Paris | |
| 2,834,183 A | 5/1958 | Bertin et al. | |
| 2,838,102 A | 6/1958 | Reimers | |
| 2,857,332 A | 10/1958 | Tenny et al. | |
| 2,860,484 A | 11/1958 | Schmnidt | |
| 2,872,780 A | 2/1959 | Schmidt | |
| 2,919,542 A | 1/1960 | Servanty et al. | |
| 2,937,500 A * | 5/1960 | Bodine, Jr. | F23C 15/00 165/84 |
| 2,948,113 A | 8/1960 | Lettice | |
| 3,005,310 A * | 10/1961 | Reder | F02K 7/067 60/249 |
| 3,035,413 A | 5/1962 | Linderoth | |
| 3,044,252 A | 7/1962 | Zwicky | |
| 3,185,871 A | 5/1965 | Bodine, Jr. | |
| 3,303,643 A | 2/1967 | Beardsley | |
| 3,462,955 A | 8/1969 | Lockwood | |
| 3,606,867 A | 9/1971 | Weissinger | |
| 3,768,926 A | 10/1973 | Pegg et al. | |
| 4,033,120 A | 7/1977 | Kentfield | |
| 4,314,444 A | 2/1982 | Putnam et al. | |
| 4,840,558 A | 6/1989 | Saito et al. | |
| 5,353,721 A | 10/1994 | Mansour et al. | |
| 5,428,951 A | 7/1995 | Wilson et al. | |
| 5,638,609 A | 6/1997 | Chandran et al. | |
| 5,665,272 A | 9/1997 | Adams et al. | |
| 6,477,829 B1 * | 11/2002 | Hunter | F02K 7/075 60/247 |
| 6,640,549 B1 | 11/2003 | Wilson et al. | |
| 6,793,174 B2 | 9/2004 | Ouellette et al. | |
| 7,637,096 B2 | 12/2009 | Razzell et al. | |
| 8,408,004 B2 | 4/2013 | Davis, Jr. et al. | |
| 8,607,542 B2 | 12/2013 | Mason | |
| D757,859 S | 5/2016 | Goitein | |
| D759,764 S | 6/2016 | Lai | |
| 9,527,588 B1 | 12/2016 | Rollefstad | |
| D784,854 S | 4/2017 | Huang et al. | |
| D795,785 S | 8/2017 | Morrison et al. | |
| D800,602 S | 10/2017 | Hsiao et al. | |
| D801,223 S | 10/2017 | Hsiao et al. | |
| D808,860 S | 1/2018 | Tian et al. | |
| D809,992 S | 2/2018 | Hu et al. | |
| D816,582 S | 5/2018 | Liang et al. | |
| 10,546,070 B2 | 1/2020 | Hellat et al. | |
| 10,995,703 B2 | 5/2021 | Maqbool | |
| 2005/0138933 A1 | 6/2005 | Tegner | |
| 2006/0260291 A1 | 11/2006 | Vandervort et al. | |
| 2007/0245712 A1 | 10/2007 | Shimo et al. | |
| 2009/0139203 A1 | 6/2009 | Rasheed et al. | |
| 2009/0178415 A1 | 7/2009 | Kretschmer | |
| 2010/0139240 A1 | 6/2010 | Levasseur | |
| 2012/0083945 A1 | 4/2012 | Oakley et al. | |
| 2012/0131901 A1 | 5/2012 | Westervelt et al. | |
| 2012/0204534 A1 | 8/2012 | Kenyon et al. | |
| 2013/0019602 A1 | 1/2013 | Kim et al. | |
| 2014/0260294 A1 | 9/2014 | Farshchian | |
| 2014/0339355 A1 | 11/2014 | Olm et al. | |
| 2016/0001879 A1 | 1/2016 | Johannessen et al. | |
| 2016/0290223 A1 * | 10/2016 | Mills | F02B 51/02 |
| 2016/0304196 A1 | 10/2016 | Alber | |
| 2017/0082067 A1 | 3/2017 | Maqbool | |
| 2017/0144756 A1 | 5/2017 | Rastgaar Aagaah et al. | |
| 2017/0152035 A1 | 6/2017 | Zhao et al. | |
| 2017/0210470 A1 | 7/2017 | Pardell | |
| 2017/0297707 A1 | 10/2017 | Rollefstad et al. | |
| 2018/0065735 A1 | 3/2018 | Ichihara | |
| 2020/0003158 A1 | 1/2020 | Maqbool | |
| 2020/0158048 A1 | 5/2020 | Maqbool | |
| 2020/0256260 A1 | 8/2020 | Maqbool et al. | |
| 2021/0108590 A1 | 4/2021 | Maqbool et al. | |

FOREIGN PATENT DOCUMENTS

| | | |
|---|---|---|
| CN | 2050553 U | 1/1990 |
| CN | 101907038 A | 12/2010 |
| CN | 111271735 A | 6/2020 |
| DE | 102013216398 A1 | 2/2015 |
| EP | 1348908 A2 | 10/2003 |
| EP | 2642204 A1 | 9/2013 |
| EP | 3390796 B1 | 2/2021 |
| EP | 3587925 B1 | 10/2021 |
| FR | 951942 A | 11/1949 |
| GB | 781482 A | 8/1957 |
| GB | 789701 A | 1/1958 |
| GB | 0409664 | 6/2004 |
| GB | 2420615 A | 5/2006 |
| JP | H0249933 A | 2/1990 |
| WO | WO-2016200459 A2 | 12/2016 |
| WO | WO-2019204389 | 10/2019 |

OTHER PUBLICATIONS https://www.khanacademy.org/science/ap-physics-1/ap-mechanical-waves-and-sound/standing-waves-ap/a/standing-waves-review-ap "Standing waves review" downlloaded Jul. 16, 2020 (Year: 2020).*

Blomquist, C. A., "Experimental Gas-Fired Pulse-Combustion Studies", prepared for Jet Propulsion Laboratory, for U.S. Department of Energy, Argonne National Laboratory, ANL/EES-TM-214, pp. 1-314, Sep. 1982 (313 pages—full document).

Evans, R.G. et al., "Pulse Jet Orchard Heater System Development: Part I. Design, Construction, and Optimization", Transactions of the ASABE, 52(2):331-343, 2009 (13 pages).

Heutschi, "Acoustics II: Electrical-Mechanical-Acoustical Analogies", Eidgenössische Technische Hochschule Zürich, Swiss Federal Institute of Technology Zurich, Jan. 18, 2013 (91 pages).

International Search Report and Written Opinion issued by the European Patent Office as International Searching Authority for International Application No. PCT/US2016/023238 dated Dec. 5, 2016 (11 pages).

International Search Report and Written Opinion issued by the European Patent Office as International Searching Authority for International Application No. PCT/US2016/067242 dated May 18, 2017 (14 pages).

International Search Report and Written Opinion issued by the U.S. Patent and Trademark Office as International Searching Authority for International Application No. PCT/US2016/023241 dated Nov. 29, 2016 (6 pages).

Ipakchi, H., "Development and performance characteristics of a family of gas-fired pulsed combustors.", Thesis for Middlesex University School of Engineering Systems, Jun. 2000 (291 pages—full document).

Poinsot, T.J. et al., "Vortex-driven acoustically coupled combustion instabilities", J. Fluid Mech, 177:265-292, 1987 (28 pages).

Reynst, F.H., "Pulsating Combustion", Pergamon Press, 6 pages—Cover Page, Copyright Page, Table of Contents and pp. 208-209 (1961).

Zheng, F. et al., "A New Acoustic Model for Valveless Pulsejets and Its Application to Optimization Thrust", Journal of Engineering for Gas Turbines and Power, 130:041501-1-041501-9, Jul. 2008 (9 pages).

European Search Report issued in EP19191692.3, dated Sep. 30, 2019 (7 pages).

(56) References Cited

OTHER PUBLICATIONS

International Search Report and Written Opinion issued by the European Patent Office as International Searching Authority, issued in PCT/US19/27801, dated May 31, 2019 (16 pages).

International Search Report and Written Opinion issued by the European Patent Office as International Searching Authority, issued in International Application No. PCT/US2019/039510 dated May 26, 2020 (14 pages).

International Preliminary Report on Patentability issued by the European Patent Office in International Application No. PCT/US2019/039510, dated Jan. 7, 2021 (8 pages).

International Preliminary Report on Patentability, issued by the European Patent Office as International Searching Authority, in International Application No. PCT/US2019/027801, dated Oct. 29, 2020 (10 pages).

Brown, R. G., "Stationary Waves," Physics Department, Duke University, Durham, NC 27708, Physics 51 Review/Lecture Notes, http://webhome.phy.duke.edu/~rgb/Class/phy51/phy51/node34.html, Apr. 12, 2004 (3 pages).

Claerbout, J., "Derivation of the Acoustic Wave Equation," Imaging the Earth's Interior, Geophysics Department, Stanford University, Stanford, CA 94305, Stanford Exploration Project, http://sepwww.stanford.edu/sep/prof/iei/xrf/paper_html/node13.html, Oct. 31, 1997 (2 pages).

U.S. Department of Energy, "Pressure Gain Combustion", National Energy Technology Laboratory, <URL: https://netl.doe.gov/node/7553>, accessed Dec. 28, 2021 (1 page).

Westberg, F., "Inside the pulsejet engine: Report 1.0", <URL: http://www.geocities.com/Area51/Rampart/9722/welcome.htm>, Apr. 25, 2000 (39 pages).

Wintenberger, E. et al. "Detonation Waves and Pulse Detonation Engines," Explosion Dynamics Laboratory, Graduate Aeronautical Laboratories, California Institute of Technology, Pasadena, CA 91125, Ae103 Class Notes, https://shepherd.caltech.edu/EDL/projects/pde/Ae103-012704.pdf, Jan. 27, 2004 (37 pages).

\* cited by examiner

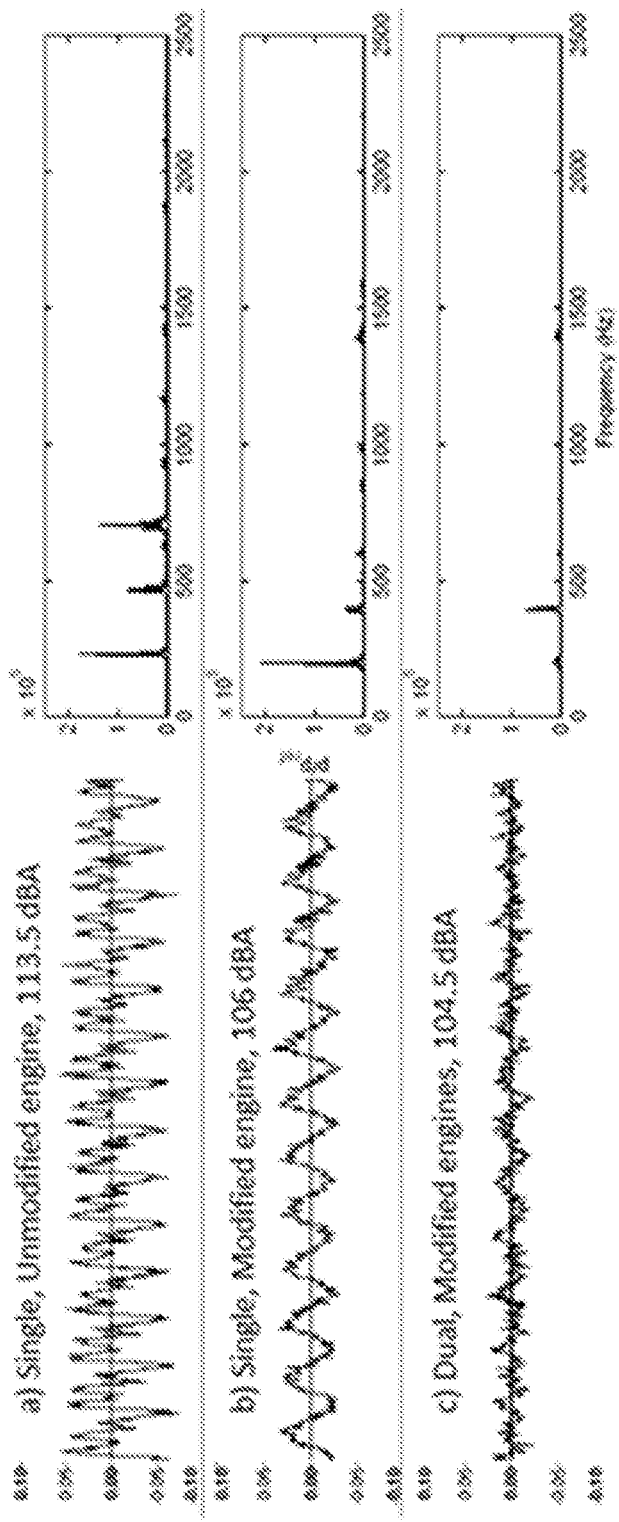
FIG. 4A-C

SYSTEMS AND METHODS FOR ANTI-PHASE OPERATION OF PULSE COMBUSTORS

CROSS-REFERENCE TO RELATED APPLICATIONS

This application is a National Stage Application of International Patent Application No. PCT/US2016/023241, filed on Mar. 18, 2016, which claims benefit of U.S. Provisional Patent Application No. 62/135,310, filed on Mar. 19, 2015, which are explicitly incorporated by reference herein in their entirety.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

TECHNICAL FIELD

The present disclosure relates to combustors and jet engines. More specifically, the present disclosure relates to pulse combustors and pulsejet engines and their operation.

BACKGROUND

A typical pulse combustor (or pulsejet engine) consists of a combustion chamber, an inlet pipe, a fuel injector, a spark plug (or other ignition means), and an exhaust pipe. The combustion chamber, inlet pipe and exhaust pipe are often cylindrical, but are not limited to such geometry and can take on a variety of shapes. The diameter of the inlet and exhaust pipes is generally smaller than the diameter of the combustion chamber, and the length of the inlet pipe is generally significantly smaller than the length of the exhaust pipe.

The advantages of pulse combustors include their ability draw in fresh air and sustain operation without any external machinery or moving parts. Pulse combustors can also be used as thrust-producing devices, in which case they are commonly referred to as "pulsejet" or "pulse jet" engines. Pulsejet engines have been in use for a long time and have been used to propel several types of aircraft over the last century. Pulsejet engines are often characterized by a diverging exhaust pipe to aid in thrust production.

Pulsejet engines are characterized by their simplicity, particularly because of the lack of moving parts. However, the oscillating nature of the flows into and out of the pulsejet engines tends to produce very high noise and vibration levels that have often been cited as the most serious hurdles in the widespread implementation of pulsejet engines. One particular goal in developing improved pulsejet engines is addressing the high noise and vibration levels. Further, another goal in developing improved pulsejet engines is improving efficiency, mechanical energy conversion, and/or thrust from pulsejet engines.

It has previously been proposed that one way to counter the oscillating nature of a pulsejet engine is to operate two pulsejet engines simultaneously but in anti-phase. In this manner, the oscillating nature of one pulsejet engine is countered by the other. An arrangement to produce such operation between two pulsejet engines has been designed and tested by several researchers, for example, in U.S. Pat. No. 4,840,558 A. This arrangement requires the exhaust pipes of two pulsejet engines to be connected via a chamber with relatively large volume and/or requires the inlet pipes of two pulsejet engines to be connected via a chamber with a relatively large volume. These connecting chambers are often referred to as 'decoupling chambers'. While this arrangement has been successful in producing anti-phase operation, it also has the detrimental effect of reducing oscillation pressure amplitude of the engines, as has been noted by several researchers, including, for example, R. G. Evans and A. S. Alshami in their paper Pulse Jet Orchard Heater System Development: Part I. Design, Construction, and Optimization, the disclosure of which is incorporated herein by reference in its entirety. This loss of oscillation pressure amplitude manifests itself as a reduction in useful mechanical power output, or in the case of a thrust-producing pulsejet, as a loss of thrust. The loss of pressure amplitude can occur for several reasons, one of which is that the insertion of a decoupling chamber between the intake pipe and the atmosphere provides higher resistance to flow drawn into the combustion chamber from the atmosphere, as compared to the case with no decoupling chamber. The result is that a smaller amount of air enters the chamber for a given pressure difference between the combustion chamber and the atmosphere, resulting in lower amounts of fuel that can be burned, and subsequently, lower energy release per cycle. Similarly, the insertion of a decoupling chamber between the exhaust pipes of pulsejets impedes the high-velocity exhaust gases, also leading to thrust loss.

None of the prior tools are especially well optimized for operating two pulsejet engines (or pulse combustors) in anti-phase. One goal in developing improved systems and methods for operation of pulsejet engines (or pulse combustors) is to provide an arrangement which would produce anti-phase operation between two pulsejet engines (or pulse combustors) with minimal interference in the operation of the individual pulsejet engines (or pulse combustors).

SUMMARY

In some embodiments, the present disclosure relates to two pulsejet engines (or pulse combustors) connected to each other at their combustion chambers by means of a connecting tube. The length of the connecting tube may corresponds to half a wavelength of the periodic operation of each pulsejet engine (or pulse combustor). In some embodiments, two pulsejet engines (or pulse combustors) connected to each other via a tube having a length corresponding to half a wavelength of the periodic operation of each pulsejet engine (or pulse combustor) operate in anti-phase.

Some embodiments of the present disclosure relate to operating two pulsejet engines (or pulse combustors) connected to each other via a tube having a length corresponding to half a wavelength of the periodic operation of each pulsejet engine (or pulse combustor), producing less noise and vibration than a single pulsejet engine (or pulse combustor) or two uncoupled pulsejet engines (or pulse combustors) because the oscillatory flow of one pulsejet engine (or pulse combustor) is countered by the oscillatory flow of the other. The unsteadiness of the combined system is less than the unsteadiness of a single pulsejet engine (or pulse combustor) or two uncoupled pulsejet engines (or pulse combustors), which results in reduced noise and vibration levels.

One aspect discussed herein relates to a pulse combustor system. The pulse combustor system includes a first pulse combustor and a second pulse combustor. The first pulse combustor includes a first combustion chamber, a first inlet pipe, a first exhaust pipe, and a first fuel injector for injecting fuel into the combustion chamber. The second pulse combustor includes a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. A tube connects the first pulse combustor combustion chamber to the second pulse combustor combustion chamber. The tube has a length corresponding to ½ of the fundamental oscillation mode wavelength.

In some embodiments, the pulse combustor system reduces exchange of gas between the connecting tube and the combustion chambers of the first and second pulse combustors during operation. In some embodiments, no gas travels from the connecting tube into the second pulse combustion chamber. In some embodiments, no gas travels into the connecting tube from the second pulse combustor.

In some embodiments, the tube has a first end connected to the first pulse combustor and a second end connected to the second pulse combustor, wherein the first end has a first oscillating pressure and the second end has a second oscillating pressure, wherein the second oscillating pressure is an opposite of the first oscillating pressure. In some embodiments, the first end and the second end are pressure antinodes during operation. In some embodiments, a center of the connecting tube is a pressure node during operation. In some embodiments, the first end and the second end are velocity nodes during operation. In some embodiments, the connecting tube has a tube oscillation mode frequency corresponding to a frequency of the fundamental oscillation mode during operation.

In some embodiments, the length of the connecting tube causes the first pulse combustor and the second pulse combustor to operate in anti-phase.

In some embodiments, oscillations of the first pulse combustor are countered by oscillations of the second pulse combustor, wherein the pulse combustor system produces reduced noise and vibration levels compared to operation of a single pulsejet combustor engine in isolation.

In some embodiments, the connecting tube is U-shaped.

A further aspect discussed herein relates to a method of reducing noise and/or vibration in a pulse combustor system. The method includes providing a first pulse combustor and a second pulse combustor. The first pulse combustor includes a first combustion chamber, a first inlet pipe, a first exhaust pipe, and a first fuel injector for injecting fuel into the combustion chamber. The second pulse combustor includes a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. The method also includes connecting the first pulse combustor to the second pulse combustor by attaching a first end of the connecting tube to the first combustion chamber and a second end of the connecting tube to the second combustion chamber. The connecting tube has a length corresponding to ½ of the fundamental oscillation mode wavelength.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF FIGURES

The foregoing and other objects, aspects, features, and advantages of the present disclosure will become more apparent and better understood by referring to the following description taken in conjunction with the accompanying drawings, in which:

FIGS. 4A-4C are plots of waveforms versus time from a microphone signal (left side) and fast Fourier transform (FFT) of the signal on the left side for various pulsejet engine configurations, according to some aspects of the present disclosure.

Figure 1:
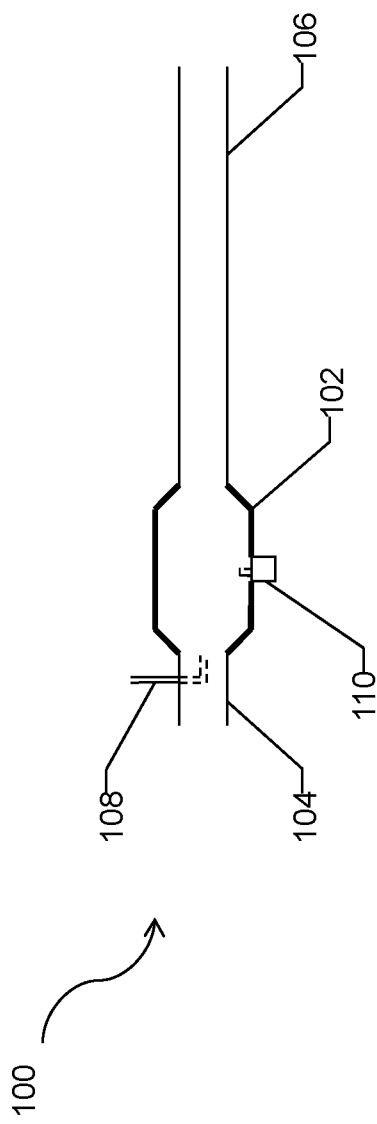
FIG. 1 is a setup of a typical conventional pulse combustor.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In this document, "pulse combustor", "pulse jet engine", "pulse jet", "pulsejet engine" or "pulsejet" refer to the same device. It is understood that a pulsejet or pulsejet engine is a pulse combustor that is used for thrust production.

In some embodiments, the present disclosure relates to systems and methods using pulse combustors operating in anti-phase. The anti-phase operation allows for countering the oscillating nature of the first pulse combustor with the oscillating nature of the second pulse combustor (and vice versa), thereby reducing noise and vibration levels as compared to a single pulse combustor operating in isolation or two uncoupled pulse combustors. The pulse combustors operating in anti-phase may be a part of an arrangement of several pulse combustors, where at least two of the pulse combustors operate in anti-phase. In some embodiments, the first pulse combustor is identical to the second pulse combustor. In some embodiments, each of the first pulse combustor and the second pulse combustor has a fundamental oscillation mode wavelength and one or more additional oscillation modes when operated in isolation. In some embodiments, pulse combustors are connected to one another at their combustion chambers. In some embodiments, the tube connecting the pulse combustion chambers has a length corresponding to ½ the fundamental oscillation mode wavelength.

Some embodiments discussed herein relate to reducing or minimizing interference on individual operation of the first and second pulse combustors during anti-phase operation. Some embodiments discussed herein relate to reducing or minimizing oscillation pressure amplitude reductions of the first and second pulse combustors during anti-phase operation. Some embodiments discussed herein relate to reducing or minimizing mechanical power output losses or thrust losses of the first and second pulse combustors during anti-phase operation.

Some embodiments discussed herein relate to determining a location for connecting the pulse combustors to one another to achieve desired system performance during anti-phase operation (e.g., reduced noise, reduced vibration, reduced interference on individual operation of the first and second pulse combustors). Some embodiments discussed herein relate to determining dimensions of a tube (or any other connector type) connecting the first pulse combustor to the second pulse combustor to achieve desired system performance during anti-phase operation.

FIG. 1 is a setup of a typical conventional pulse combustor 100. In FIG. 1, the pulse combustor 100 is comprised of the following: an inlet pipe 104 connected to a combustion chamber 102. The combustion chamber 102 is also connected to an exhaust pipe 106. There is also a fuel injector 108 located in the inlet pipe 104, but other locations and geometries for the fuel injector 108 are also possible. For example, it is also possible to place the fuel injector 108 in the combustion chamber 102. A spark plug 110 is located in the combustion chamber 102 for starting the pulse combustor. The spark plug 110 may be located anywhere in the combustion chamber 102. Any other ignition means (such as, for example, a glow plug) can also be used instead of a spark plug 110.

When fuel and air are introduced into the combustion chamber, a spark produced by the spark plug or other ignition means ignites the fuel-air mixture. The ensuing combustion process causes a rise in the temperature and pressure of the gases inside the combustion chamber. These gases then expand and escape through the inlet and exhaust pipes. The high velocity of the escaping gases causes an overexpansion and negative pressure inside the combustion chamber. This negative pressure then reverses the direction of the flow in the inlet and exhaust pipes. Fresh air drawn in from the atmosphere via the inlet pipe mixes with the fuel (which is injected either in the inlet pipe or directly into the combustion chamber) and enters the combustion chamber where it encounters high-temperature combustion products from the previous combustion event. These combustion products ignite the fresh fuel-air mixture to produce another combustion event and the process repeats indefinitely. It should be noted that there is also flow reversal in the exhaust pipe due to the negative pressure in the combustion chamber, but due to the longer length of the exhaust pipe, the fresh air drawn in from the atmosphere via the exhaust pipe does not reach the combustion chamber before the process restarts. It should also be noted that the spark plug is generally only needed to start operation of the engine, and not to sustain it. Therefore, the spark plug can be turned off once the engine has started.

The net result of the working cycle of a pulse combustor is that the inlet and exhaust ends produce oscillating flows of gas. These oscillating flows are responsible for thrust generation. The exhaust pipe usually generates the highest amount of thrust, but the inlet pipe can also generate a significant amount of thrust. Therefore, in order to make the thrust from the inlet pipe point in the same direction as the thrust from the exhaust pipe, the inlet pipe is often turned to point in the same direction as the exhaust pipe (or vice versa), or is simply attached to the same side of the combustion chamber as the exhaust pipe. Pulsejet engines can be made in a variety of forms. Some have multiple inlets, while others have inlets that are perpendicular to the exhaust pipe. Nevertheless, all these embodiments have the same working principle and are essentially the same device.

Figure 2A:
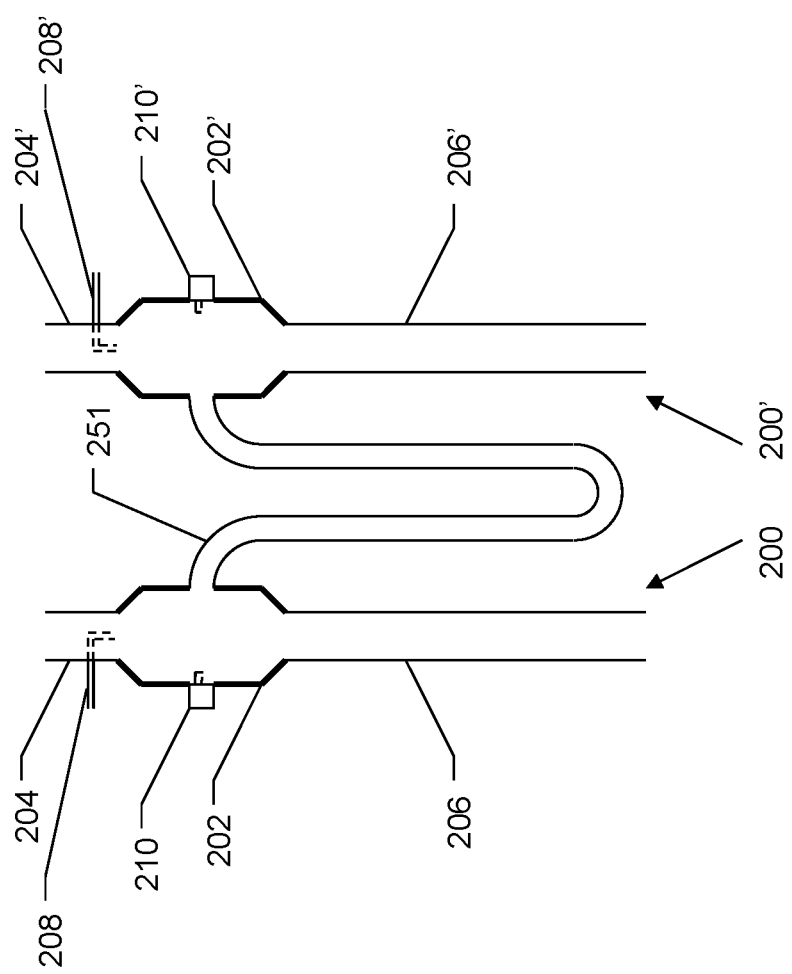
FIG. 2A is a setup of a pulse combustor arrangement with two pulse combustors 200 and 200' operating in anti-phase, according to some aspects of the present disclosure.

FIG. 2A shows a pulse combustor arrangement with two pulse combustors 200 and 200' operating in anti-phase, according to some aspects of the present disclosure. In FIG. 2A, pulse combustor 200 includes an inlet pipe 204 connected to a combustion chamber 202. The combustion chamber 202 is also connected to an exhaust pipe 206. There is also a fuel injector 208 located in the inlet pipe 204, but other locations and geometries for the fuel injector 208 are also possible. For example, it is also possible to place the fuel injector 208 in the combustion chamber 202. A spark plug 210 may be located in the combustion chamber 202 for starting the engine. Any other ignition means (such as a glow plug) can also be used instead of a spark plug.

Pulse combustor 200' may include an inlet pipe 204' connected to a combustion chamber 202'. The combustion chamber 202' is also connected to an exhaust pipe 206'. There is also a fuel injector 208' located in the inlet pipe 204', but other locations and geometries for the fuel injector 208' are also possible. For example, it is also possible to place the fuel injector 208' in the combustion chamber 202'. A spark plug 210' is located in the combustion chamber 202' for starting the engine. Any other ignition means (such as a glow plug) can also be used instead of a spark plug. The pulse combustor 200' has the same physical dimensions as the pulse combustor 200. A connecting tube 251 connects combustion chamber 202 with combustion chamber 202'. The connecting tube 251 is in fluid connection with the combustion chamber 202 and the combustion chamber 202'. Connecting tube 251 in FIG. 2A is shown as bent (u-shaped), but the exact shape of the connecting tube 251 is not critical to the operation of the pulse combustors as described herein.

Pulsejet engines have often been analyzed using acoustic theories; it has been suggested in scientific and engineering literature that the combination of the combustion chamber and relatively short inlet pipe of a pulse combustor behaves as a Helmholtz resonator, whereas the relatively long exhaust tube of a pulse combustor qualitatively behaves as a quarter-wave tube (or a one-sixth-wave tube, according to some researchers). A pulsejet engine can therefore be modeled as a combination of a Helmholtz resonator and a quarter-wave or one-sixth-wave tube. The stable frequency of operation of the pulse combustor is related to the fundamental frequencies of the supposed Helmholtz resonator and the quarter-wave or one-sixth-wave tube.

A pulse combustor produces pressure oscillations in the combustion chamber and flow oscillations in the inlet and exhaust pipes, as discussed above. The frequency of these oscillations is denoted as 'f', which refers to the number of combustion events per second inside the engine, i.e., the operating frequency of the engine, which is equal to (or close to) the frequency of the fundamental ($1^{st}$) mode as that is the main driving force in the engine. In most engines, the frequency of the fundamental is between about 50-250 Hz. The average speed of sound inside the pulse combustor is denoted as 'c'. The corresponding wavelength, denoted as 'λ', can be calculated using the formula, λ=c/f.

As discussed above, a pulse combustor can be modeled as a combination of a Helmholtz resonator and a quarter-wave or one-sixth-wave tube. An isolated, single pulse combustor will generally have a stable mode of oscillation. A pulsejet can have many different modes with their corresponding frequencies and wavelengths, but the main driving force behind the engine, and the one that carries the most energy, is the fundamental ($1^{st}$) mode. The other modes ($2^{nd}$, $3^{rd}$ etc.) that get excited contain less energy than the fundamental and can be seen as nuisances superimposed on top of the fundamental. In some embodiments, the mode following the fundamental (e.g., the second oscillation mode) has a higher frequency than the fundamental, and the mode following that mode (e.g., the third oscillation mode) has an even higher frequency. Accordingly, for the purposes of discussing the basic operation of the engine and its behaviour relative to other engines (anti-phase), the most relevant mode is the fundamental, accordingly, the frequency and wavelength of the stable mode as discussed herein refers to that of the fundamental. Practically, the frequency (f) for an engine is the number of combustion events per second—this frequency is approximately the frequency of the fundamental mode, and can be easily measured. The corresponding wavelength is λ=c/f (c is the speed of sound).

This stable mode of oscillation is due to the natural oscillation mode of the Helmholtz resonator (combination of combustion chamber and inlet pipe) and the fundamental mode of the quarter-wave or one-sixth-wave tube (exhaust pipe). As a result, the stable frequency of operation of the pulse combustor is related to the fundamental frequencies of the supposed Helmholtz resonator and the quarter-wave or one-sixth-wave tube. Therefore, the wavelength of operation of a pulse combustor, λ, can sometimes be approximated as the wavelength of operation of a Helmholtz resonator which is comprised of the combustion chamber and the inlet pipe of the pulse combustor, which is discussed, for example, in "A new acoustic model for valveless pulsejets and its application for optimization thrust", F. Zheng et al., *J. Eng. Gas Turbines Power* 130(4), 041501 (Apr. 28, 2008). One skilled in the art would know how to calculate this wavelength. The frequency of a Helmholtz resonator is $$= \frac{c}{2\pi}\sqrt{\frac{S}{VL}},$$

and the corresponding wavelength can be calculated as λ=c/f. This wavelength (of the supposed Helmholtz resonator) can be used to approximate the maximum allowed length of the connecting tube.

If two pulse combustors are connected to each other at their combustion chambers via a connecting tube, there is more than one possible mode of oscillation. If gas is allowed to move through the connecting tube, it can result in an oscillation mode which has a higher frequency. This is because the connecting tube can provide an additional avenue for gases to escape and enter the combustion chambers. This in turn can result in faster emptying and filling of the combustion chambers, which corresponds to a higher frequency of operation.

In some embodiments, the length of the connecting tube 251 may be half the wavelength, λ, of the stable mode of operation of the pulse combustor (e.g., 200, 200'). In some embodiments, the first and the second pulse combustor have identical stable modes of operation (e.g., identical fundamental oscillation modes) when operated in isolation. In some embodiments, the first pulse combustor and the second pulse combustor are identical. In other words, in some embodiments, the length of the connecting tube 251 is nominally λ/2.

Figure 3A:
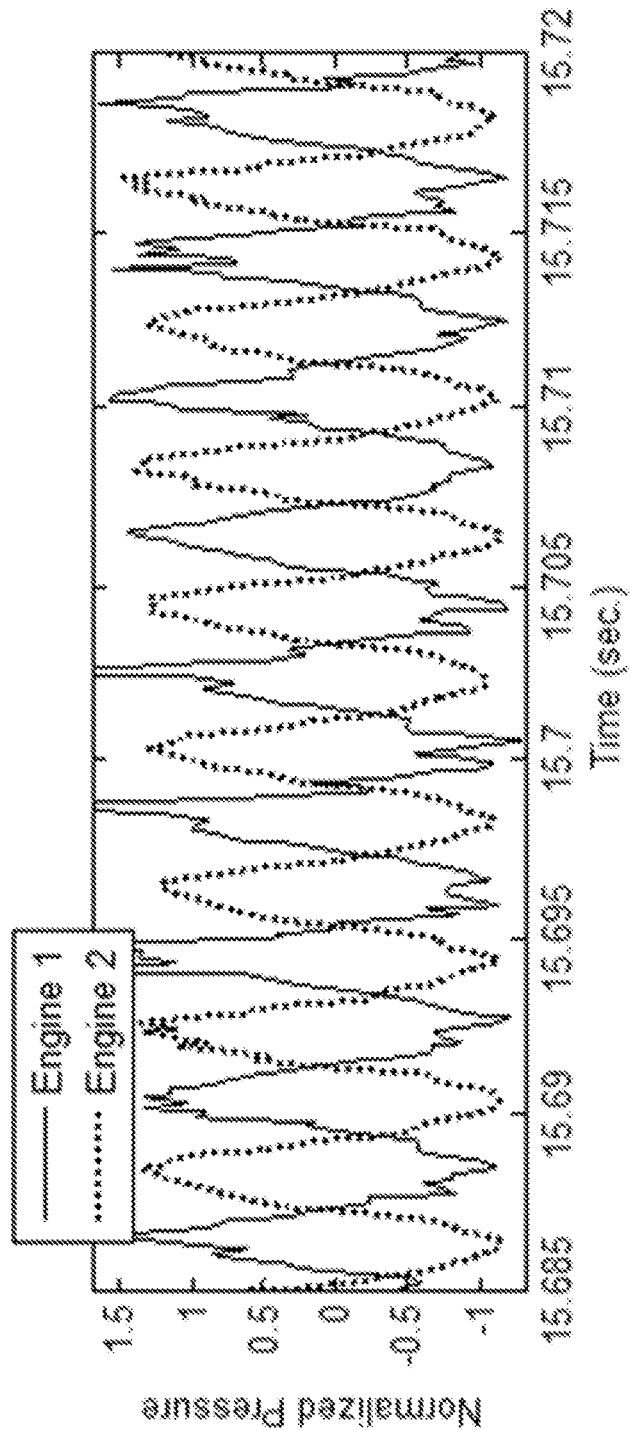
FIG. 3A is a plot of normalized pressure versus time from an experimental engine chamber with two pulsejet engines operating in anti-phase, according to some aspects of the present disclosure.

In some embodiments, the length of the connecting tube 251 is half a wavelength, λ/2, (a tube with such a length is often referred to as an acoustic "half-wave tube"). If gas is allowed to move through the connecting tube 251, it will result in an oscillation mode which is different from that which the engine prefers to operate at naturally (in isolation). This is because the connecting tube provides an additional avenue for gases to escape and/or enter the combustion chamber, which results in faster or slower emptying and filling of the combustion chamber, which corresponds to modes of oscillation different from the natural, isolated oscillation mode of a single engine. In some embodiments, the connecting tube 251 will not admit any gas from, or expel any gas into, the combustion chambers if the pulse combustors operate at their natural, isolated operating modes/frequencies, but in anti-phase (180° out of phase). This is the stable operating mode of the coupled system, as has been experimentally verified, for example, as shown in FIG. 3A. The engines were connected by a 36 inch long, 0.25 inch diameter tube.

Figure 2B:
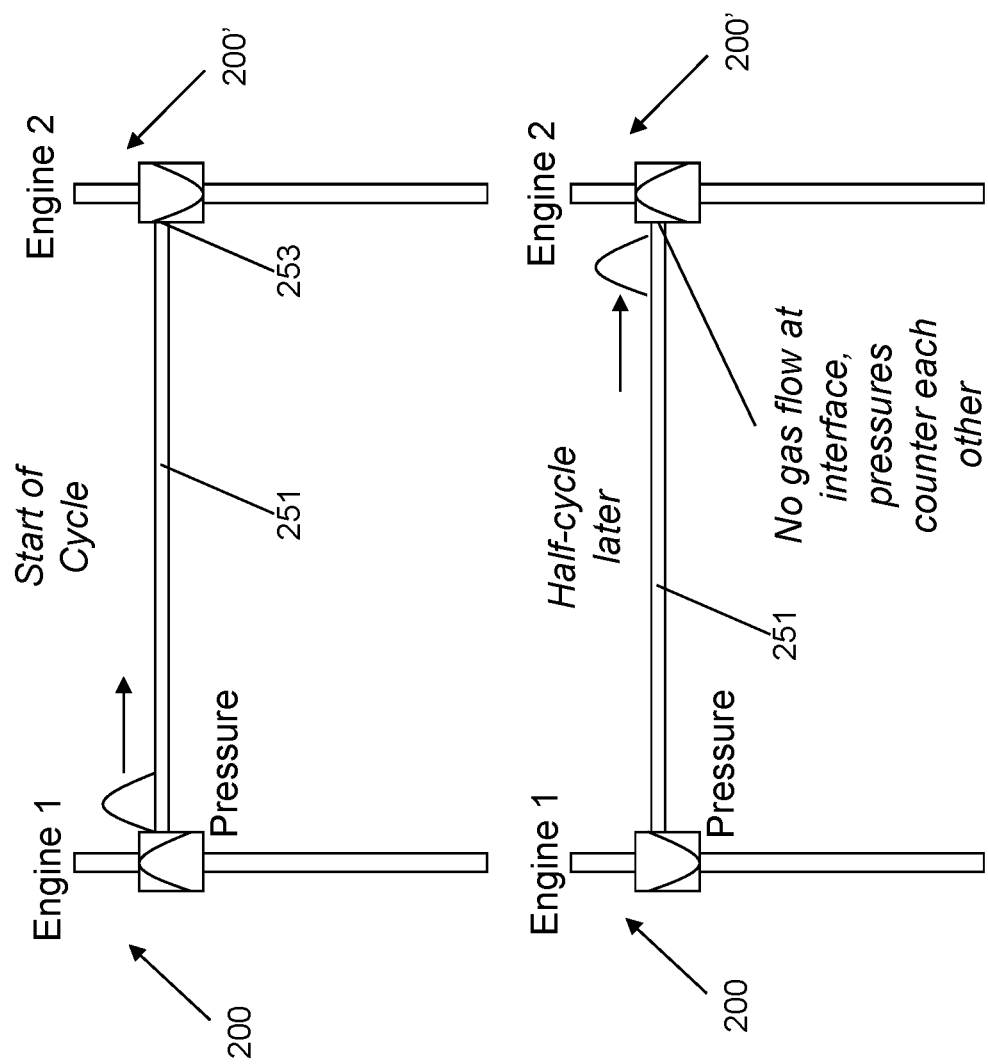
FIGS. 2B-2C are exemplary setups of two pulse combustors operating in anti-phase, according to some aspects of the present disclosure.
Figure 2C:
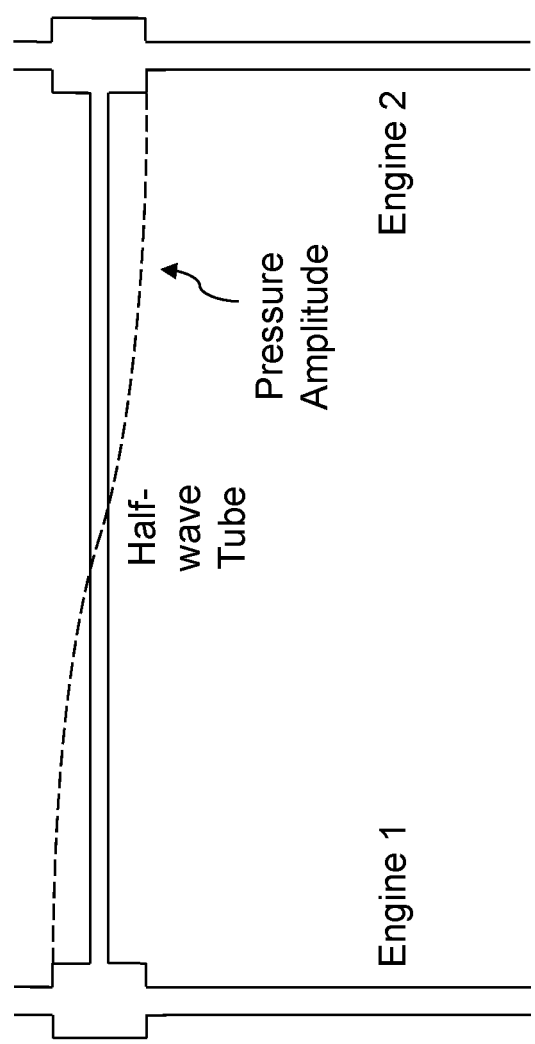

In other words, the stable mode is generally the one in which the connecting tube (e.g., 251 of FIG. 2A) exchanges no gas with the combustion chambers (e.g., 200 and 200' of FIG. 2A). In some embodiments, this stable mode corresponds to the scenario where the connecting tube (e.g., 251 of FIG. 2A) of length λ/2 accommodates half a periodic wave and the combustion chambers (e.g., 202, 202' of FIG. 2A) of the pulse combustors (e.g., 200, 200' of FIG. 2A) impose anti-phase pressure oscillations on either end of the connecting tube (e.g., 251 of FIG. 2A). In some embodiments, the ends of the connecting tube (e.g., 251 of FIG. 2A) constitute pressure antinodes, and the center of the connecting tube (e.g., 251 of FIG. 2A) constitutes a pressure node. Acoustic principles then imply velocity nodes at the ends of the connecting tube as shown in FIG. 2C, which means that no gas is exchanged with the combustion chambers.

While in the ideal case, no gas would be exchanged between the combustion chambers (e.g., combustion chambers 202 and 202' in FIG. 2A) and the connecting tube (e.g., 251 in FIG. 2A), non-ideal effects, such as viscosity, may cause deviations from ideal behavior. However, even when there are deviations from the ideal behavior, a tube with length λ/2 connecting the combustion chambers (e.g., combustion chambers 202 and 202' in FIG. 2A) of two pulse combustors (e.g., pulse combustors 200 and 200' in FIG. 2A) will cause the pulse combustors to operate in anti-phase, because this mode of operation minimizes the exchange of gas between the connecting tube and the combustion chambers.

In some embodiments, if two engines operating in anti-phase is the desired configuration, the engines need to be connected with a half-wave tube. If the length of the connecting tube is increased, then eventually the connecting tube itself will become long enough to be able to absorb some of the gas in itself. For example, when the length of the connecting tube is short compared to the wavelength (e.g., less than about λ/8), such a tube could not accommodate any wave behaviour. However, in some embodiments, if the connecting tube is longer (e.g., longer than about λ/8), its length starts to become significant as compared to the wavelength, and the tube can therefore start accommodating wave behaviour, i.e. it can start internalizing the fluctuations it is exposed to at either end. In this case, a long tube of arbitrary length will not cause the engines to lock in anti-phase. In some embodiments, a tube having a length that is carefully selected/optimized will cause the engines to lock in anti-phase.

In some embodiments, the connecting duct is effectively a closed end for the engines operating in anti-phase. For example, engine 1 (200) may be at the positive pressure part of its cycle (e.g., as shown in FIG. 2B). This sends a pulse of positive pressure down the connecting tube 251. If this positive pressure pulse arrives at the positive pressure part the cycle of engine 2 (200'), then no gas will be able to travel in/out from the connecting duct 251 and out/in from engine 2 (200'), because the pressure at that end 253 of the connecting duct 251 and in engine 2 (200') is the same. Basically, a high pressure inside engine 2 (200') would like to send air into the connecting duct 251, but the positive pressure pulse from engine 1 (200) has arrived at just the right time and counters the high pressure from engine 2 (200') (and vice versa). This makes the connecting duct 251 look like a closed end and produces anti-phase operation. However, this may only possible if the length of connecting duct 251 is half a wavelength so that the pulses are timed correctly.

Some embodiments discussed herein relate to designing pulsejet systems where two pulsejet engines operate in anti-phase. In some embodiments, there is no leakage of air from engine 1 to engine 2 because at the positive pressure part of engine 1's cycle (when the pulse was sent out by engine 1), a positive pressure arrives from engine 2, at just the right time to counter any flow into the connecting tube—the connecting tube is allowing pulses to travel both ways and constantly uses the pressure from one engine to stop air flow from one engine to the other.

In some embodiments, the engines will operate in anti-phase regardless of how the fuel is injected (e.g., constant or pulsed).

Long tubes exhibit their own oscillation modes, and a "half-wave tube" has a mode in which the ends oscillate at opposing pressures (e.g., as shown in FIG. 2C below). At the correct connecting tube length (e.g., $\lambda/2$), the frequency of this mode (in the connecting duct) is the same as the frequencies of the individual engines, and the pressure fluctuations at the ends of the tube keep any gas from coming into or out of the engines as long as they operate in anti-phase, which is why the engines prefer to naturally operate in anti-phase.

In some embodiments, the connecting tube (e.g., connecting tube 251 in FIG. 2A) may have a diameter of approximately one-half of that of the inlet pipe 204 (or inlet pipe 204'). In some embodiments, the connecting tube (e.g., connecting tube 251) has a diameter smaller than the diameter of the inlet pipe (e.g., inlet pipe 204 or 204' in FIG. 2A). In some embodiments, the diameter of the connecting tube (e.g., connecting tube 251 in FIG. 2A) should be large enough to have an appreciable effect on the pulse combustors (e.g., pulse combustor 200 or 200' in FIG. 2A), but small enough to not affect the fundamental nature of operation of a pulse combustor. In some embodiments, the diameter of the connecting tube is determined empirically.

In some embodiments, arrangements where two pulse combustors (e.g., 200, 200' in FIG. 2A) are connected via a connecting tube (e.g., connecting tube 251 in FIG. 2A) to operate in anti-phase provide advantages over a single or conventional pulse combustor. In some embodiments, single pulse combustors may have an intermittent operation which causes oscillatory flows and pressure variations. This may result in high noise and vibration levels. In some embodiments, two pulse combustors operate 180° out of phase, which causes the oscillation due to one pulse combustor to be countered by the oscillation due to the other. In some embodiments, the anti-phase oscillations of the two pulse combustors result in destructive interference, which results in less vibration and lower noise levels, as compared to a single, conventional pulse combustor or two uncoupled pulse combustors.

FIG. 3A is a plot of normalized pressure versus time from an experimental engine chamber with two pulsejet engines operating in anti-phase, according to some aspects of the present disclosure. In some embodiments, anti-phasing cancels a low frequency fundamental component to which the human ear is relatively insensitive. Accordingly, in some embodiments, anti-phasing results in a sharp drop in signal amplitude, but provides a perceived noise reduction of an additional 2-3 dBA versus the modified engine noise measurements shown in FIG. 4B. However, anti-phasing has a significant effect on decreasing vibration levels, which cannot be quantified with A-weighting.

Figure 3B:
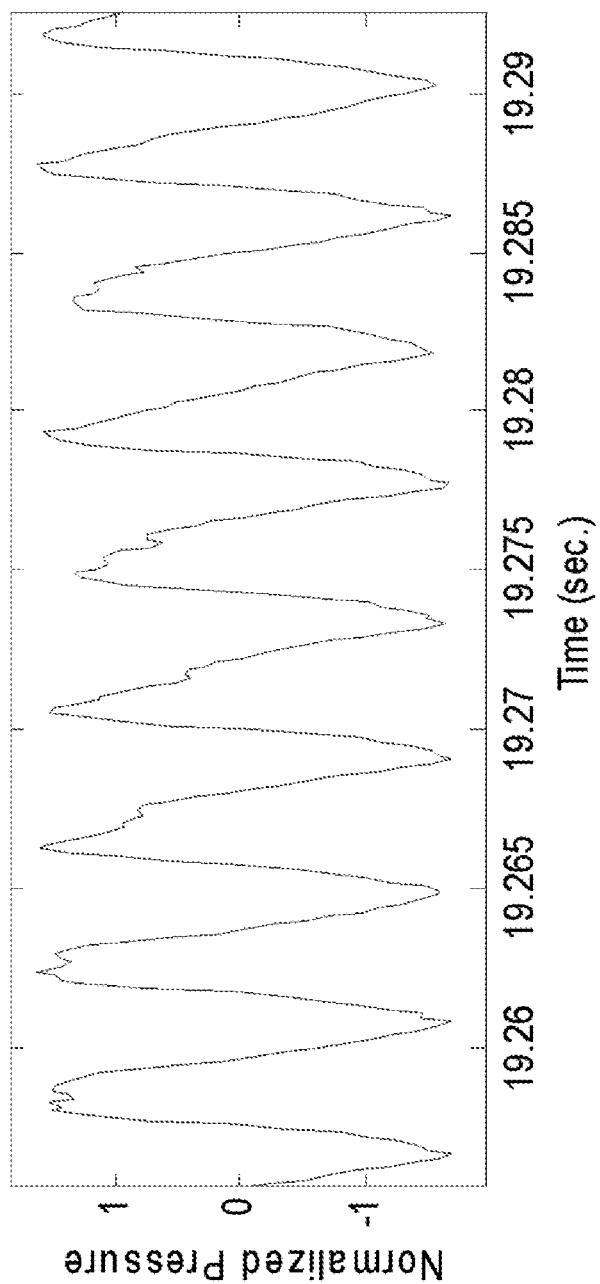
FIG. 3B is a plot of normalized pressure versus time for an exemplary single engine operating in isolation, the engine having dimensions that are the same as for the engine shown in FIG. 3A, according to some aspects of the present disclosure.

FIG. 3B is a plot of normalized pressure versus time from an experimental engine chamber with a single pulsejet engine having the same dimensions as the pulsejet engines shown in FIG. 3A. The dimensions of the pulsejet engines used to obtain the data shown in FIGS. 3A-B are the shown in FIG. 4D. The measurements for the pulsejet engine shown in FIG. 3B were made using a pressure sensor connected at the combustion chamber.

Figure 4D:
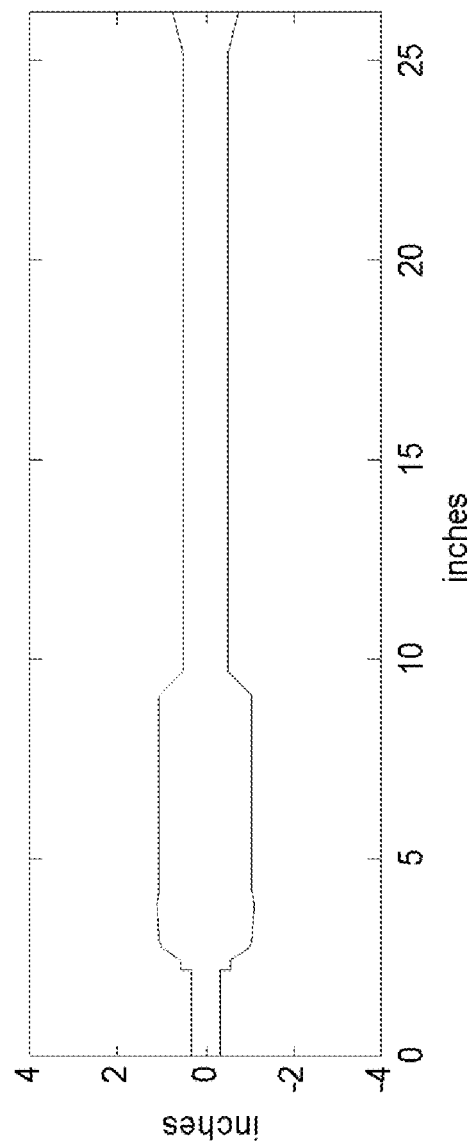
FIG. 4D shows dimensions of each of the engines used to obtain the data shown in FIG. 4A, according to some aspects of the present disclosure.

FIGS. 4A-C are plots of waveforms versus time from a microphone signal (left side) and fast Fourier transform (FFT) of the signal on the left side for various pulsejet engine configurations, according to some aspects of the present disclosure. The left side of FIG. 4A is a plot of waveform versus time from a microphone signal of a single, unmodified pulsejet engine, giving noise at a level of 113.5 dBA. The waveform profile in FIG. 4A is rough and includes multiple sharp peaks over a single firing cycle. As seen in the FFT image on the right side of FIG. 4A, there is significant harmonic content as there are multiple peaks after the first large peak, indicating undesired modes of oscillation. The high frequency content and signal roughness generally arise because the uncontrolled combustion process excites multiple oscillation modes inside the engine, which is like an acoustic duct. The roughness of the signal generally produces most of the perceived noise. A typical large valveless pulsejet fires at approximately 100 Hz, a low frequency that the human ear is quite insensitive to, but these pulsejets are still considered to be very loud, which is due to the roughness of the signal, which adds significant high-frequency content to the signal that humans can hear very well. The dimensions and setup of the engine shown in FIG. 4A are shown in FIG. 4D.

The FFT (Fast Fourier Transform, or essentially just the Fourier Transform) for the noise signals is indicative of the distribution of energy across the spectrum of frequencies. If the waveform were a perfect sinusoid, the FFT would show a single peak at the frequency of the sinusoid. But instead, the waveform is jagged and displays multiple peaks over the course of a firing cycle (e.g., as shown in FIG. 4A), which means that the energy is not just in the fundamental mode (which corresponds approximately with the first FFT peak), but that the energy is also spread into the higher frequencies due to the jagged-ness and multiple peaking, resulting in the peaks at higher frequencies in FIG. 4A.

FIG. 4B (left) is a plot of waveform versus time from a microphone signal of a single, modified pulsejet engine, giving noise at a level of 106 dBA. As seen in FIG. 4B, the amplitude of the signal is significantly lower than in FIG. 4A; moreover, the FFT plot on the right side shows one large fundamental peak, and significantly smaller additional peaks, indicating significant reduction in harmonic/high frequency content as compared to FIG. 4A. The removal of harmonic/high frequency content results in a noise reduction of about 7.5 dBA as compared to the unmodified engine, which is a significant reduction. A reduction of 10 dBA is generally accepted to be subjectively half as loud. The dimensions of the engine in FIG. 4B are shown in FIG. 4D, but the engine has been modified to reduce undesirable modes of oscillation.

In FIG. 4B, the FFT waveform is much smoother or 'cleaner' than that seen in FIG. 4A, and it can be seen that the high-frequency content has been largely removed. This can also be seen in the FFT where the peaks at higher frequency have been greatly diminished, and only a strong fundamental remains—this indicates that the energy is largely concentrated at a single frequency, resulting in a smooth waveform.

FIG. 4C (left) is a plot of waveform versus time from a microphone signal of a dual modified pulsejet engine setup, operating in anti-phase, giving noise at a level of 104.5 dBA. As seen in FIG. 4C, operating the modified engines in anti-phase results in further reduction in signal amplitude compared to the signal in FIG. 4B. Further, operating the modified engines in anti-phase as shown in FIG. 4C results in an additional noise reduction of about 1.5 dBA. Further, operating the modified engines in anti-phase as shown in FIG. 4C results in significant reduction in vibrations. The arrangement shown in FIG. 4C results in a noise reduction of 9 dBA as compared with a single, unmodified pulsejet (FIG. 14A), which is a significant reduction.

In FIG. 4C, the effect of anti-phasing two engines is to cause destructive cancellation of the base/fundamental signal, and it can be seen in the FFT plot that the fundamental component/peak has essentially been eliminated because of this—it essentially means that there is little to no energy at this base/fundamental frequency anymore because it has all been cancelled by the anti-phasing effect. A small high-frequency peak can be seen at ~400 Hz. This peak arises because the signals from FIG. 4B are not perfect sinusoids—they are close to being perfectly sinusoidal, but are not actually perfect, and the imperfections keep the signals from cancelling perfectly. The result is that some high-frequency content survives and can actually add to produce a small peak at some higher frequency, which is what is seen in FIG. 4C. However, the overall noise levels still decrease, and as the quality of the modified signal (FIG. 4B) improves, the quality of the cancellation improves and the possibility of any higher-frequency peaks decreases. In FIG. 4C, two identical engines (e.g., each as shown in FIG. 4B) are connected via a 42 inch long, 0.25 inch-diameter tube for anti-phase operation.

Figure 4E:
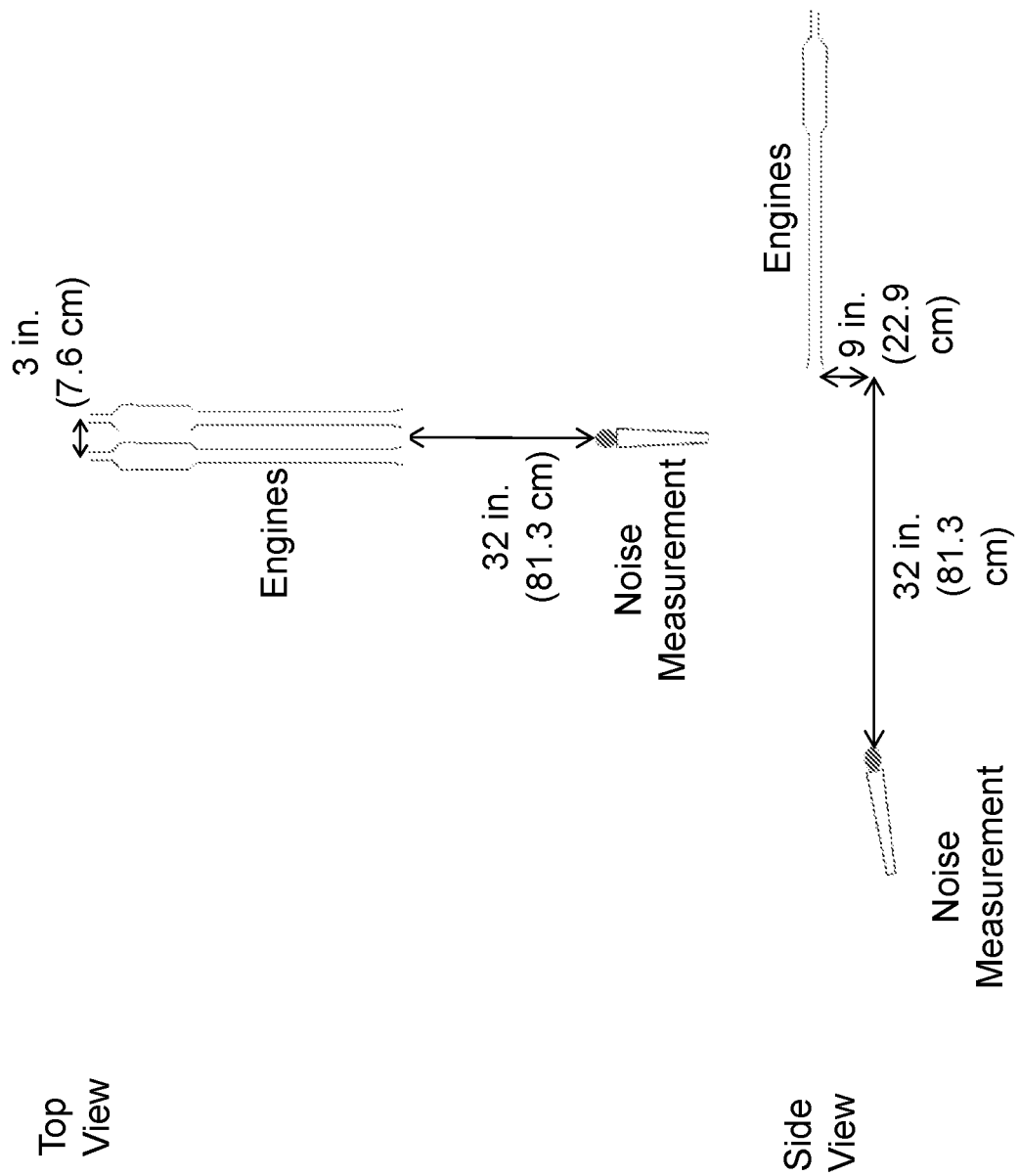
FIG. 4E shows two exemplary views of a setup used to make noise measurements for the data shown in FIGS. 4A-4C, according to some aspects of the present disclosure.

FIG. 4E includes two views of an experimental setup used for the noise measurements of two engines operating in anti-phase.

It is contemplated that systems, devices, methods, and processes of the claimed disclosure encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed:

1. A deflagration pulse combustor system, comprising:
   a first deflagration pulse combustor, comprising a first combustion chamber, a first inlet pipe, a first exhaust pipe, and a first fuel injector for injecting fuel into the first combustion chamber;
   a second deflagration pulse combustor, comprising a second combustion chamber, a second inlet pipe, a second exhaust pipe, and a second fuel injector for injecting fuel into the second combustion chamber, the first deflagration pulse combustor and the second deflagration pulse combustor having a fundamental oscillation mode and one or more additional oscillation modes when operated in isolation;
   a tube having a first end connected to the first deflagration pulse combustor combustion chamber and a second end connected to the second deflagration pulse combustor combustion chamber, the tube having a length corresponding to substantially ½ of the fundamental oscillation mode wavelength with the tube being configured to substantially prevent a loss of thrust generation in each of the first and second deflagration pulse combustors in anti-phase operation of the first and second pulse combustors, and wherein the tube is substantially prevented from an ingress or egress of combustion generated gases from the first combustor chamber or second combustor chamber during anti-phase operation of the system by a maximum positive pressure pulse timed to arrive at the first or second end of the tube to prevent such ingress or egress of combustion generated gases, with the tube having a diameter that is substantially ½ of a diameter of the first inlet pipe of the first deflagration pulse combustor or a diameter of the second inlet pipe of the second deflagration pulse combustor, and with the tube having a standing wave therein for generating the maximum positive pressure pulse and causing pressure anti-nodes to be formed at the first and second ends for providing high impedance at the first and second ends thereof.

2. The deflagration pulse combustor system of claim 1, wherein the first end of the tube has a first oscillating pressure and the second end of the tube has a second oscillating pressure, wherein the second oscillating pressure is an opposite of the first oscillating pressure.

3. The deflagration pulse combustor system of claim 2, wherein the first end and second end respectively including a velocity node during operation.

4. The deflagration pulse combustor system of claim 1, wherein a center of the tube includes a pressure node during operation.

5. The deflagration pulse combustor system of claim 1, wherein the tube includes a tube oscillation mode frequency corresponding at least to a frequency of the fundamental oscillation mode during operation.

6. The deflagration pulse combustor system of claim 1, wherein oscillations of the first deflagration pulse combustor include being countered by oscillations of the second deflagration pulse combustor, and wherein the deflagration pulse combustor system generates reduced noise and vibration levels compared to operation of a single pulsejet combustor in isolation.

7. The deflagration pulse combustor of claim 1, wherein the tube has a U-shaped.

8. The deflagration pulse combustor of claim 1, wherein dimensions of the first deflagration pulse combustor are substantially identical to dimensions of the second deflagration pulse combustor.

9. The deflagration pulse combustor system of claim 1, wherein the tube has a tube oscillation mode frequency corresponding to a frequency of the fundamental oscillation mode during operation.

10. A method for reducing noise and/or vibration in a deflagration pulse combustor system having at least a first deflagration pulse combustor, a second deflagration pulse combustor, and a tube connected between the first and second deflagration pulse combustors, comprising:

providing the first deflagration pulse combustor that further comprises a first combustion chamber, a first inlet pipe, a first exhaust pipe, and a first fuel injector for injecting fuel into the first combustion chamber;

providing the second deflagration pulse combustor that further comprises a second combustion chamber, a second inlet pipe, a second exhaust pipe, and a second fuel injector for injecting fuel into the second combustion chamber, with the first deflagration pulse combustor and the deflagration second pulse combustor having a fundamental oscillation mode and one or more additional oscillation modes when operated in isolation;

the tube for connecting the first combustion chamber of the first deflagration pulse combustor to the second combustion chamber of the second deflagration pulse combustor that includes attaching a first end of tube to the first combustion chamber and a second end of the tube to the second combustion chamber, with the tube having a length corresponding to substantially ½ of the fundamental oscillation mode wavelength with the tube being configured to substantially prevent a loss of thrust generation in each of the first and second deflagration pulse combustors in anti-phase operation of the first and second pulse combustors, and wherein the tube is substantially prevented from an ingress or egress of combustion generated gases from the first combustor chamber or second combustor chamber during anti-phase operation of the system by a maximum positive pressure pulse timed to arrive at the first or second end of the tube to prevent such ingress or egress of combustion generated gases, with the tube having a diameter that is substantially a predetermined ½ of a diameter of the first inlet pipe of the first deflagration pulse combustor or a diameter of the second inlet pipe of the second deflagration pulse combustor, and with the tube having a standing wave therein for generating the maximum positive pressure pulse and causing pressure anti-nodes to be formed at the first and second ends for providing high impedance at the first and second ends thereof.

* * * * *

UNITED STATES PATENT AND TRADEMARK OFFICE
CERTIFICATE OF CORRECTION

PATENT NO. : 11,578,681 B2
APPLICATION NO. : 15/558022
DATED : February 14, 2023
INVENTOR(S) : Daanish Maqbool It is certified that error appears in the above-identified patent and that said Letters Patent is hereby corrected as shown below:

In the Claims

Please correct Claim 6, Column 13, Lines 39-45 to read:
6. The deflagration pulse combustor system of claim 1, wherein oscillations of the first deflagration pulse combustor include being countered by oscillations of the second deflagration pulse combustor, and wherein the deflagration pulse combustor system generates reduced noise and vibration levels compared to operation of a single pulsejet combustor in isolation.

Signed and Sealed this
Twenty-third Day of May, 2023

Katherine Kelly Vidal
*Director of the United States Patent and Trademark Office*